(12) United States Patent
Liu et al.

(10) Patent No.: US 11,734,649 B1
(45) Date of Patent: Aug. 22, 2023

(54) AUTOMATED EVALUATION OF CODE DELIVERY

(71) Applicant: INTERNATIONAL BUSINESS MACHINES CORPORATION, Armonk, NY (US)

(72) Inventors: Bo Tong Liu, Beijing (CN); Qi Li, Beijing (CN); Cheng Fang Wang, Beijing (CN); Yan Wei Zhao, Beijing (CN); Cai Hua Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/831,609

(22) Filed: Jun. 3, 2022

(51) Int. Cl.
*G06F 8/70* (2018.01)
*G06Q 10/101* (2023.01)
(Continued)

(52) U.S. Cl.
CPC .............. *G06Q 10/101* (2013.01); *G06F 8/70* (2013.01); *G06F 18/22* (2023.01); *G06Q 10/103* (2013.01)

(58) Field of Classification Search
CPC ............. G06F 11/3442; G06F 11/3466; G06F 11/3476; G06F 8/70; G06F 18/22;
(Continued)

(56) References Cited

U.S. PATENT DOCUMENTS 9,176,850 B2 11/2015 Singh
9,921,952 B2 3/2018 Dean
(Continued)

FOREIGN PATENT DOCUMENTS

CN 105183658 A 12/2015
TW 695284 B 6/2020

OTHER PUBLICATIONS

"Method and System for Assessing the Business Risk of a Software Application and Using That to Automate Workflow Based Deployment", An IP.com Prior Art Database Technical Disclosure, Authors et. al.: Disclosed Anonymously, IP.com No. IPCOM000265443D, IP.com Electronic Publication Date: Apr. 9, 2021, 11 pages.
(Continued)

*Primary Examiner* — Justin S Lee
(74) *Attorney, Agent, or Firm* — Christopher M. Pignato

(57) ABSTRACT

Systems, methods and/or computer program products for automating evaluations of code deliveries for software projects. Automated evaluations are generated by selecting software projects and dividing a project into a plurality of code blocks by analyzing the code, build file and build log. Attributes of code blocks are extracted and correlations between code blocks are calculated. Dynamic distance between code blocks is calculated by the correlation and code delivery history, to create a Dynamic General Distance Map and Dynamic User Distance Map for the code blocks. Code delivery distance indicating the code delivery behavior is generated by the Dynamic User Distance Map while the delivery assessment criteria is generated to evaluate code delivery and assess levels of risk associated with delivery of the code. High-level risk indicates that a code delivery may not follow best practices and users are alerted to pay more attention to the code delivery during review.

20 Claims, 12 Drawing Sheets

(51) Int. Cl.
*G06Q 10/10* (2023.01)
*G06F 18/22* (2023.01)

(58) Field of Classification Search
CPC .. H03M 13/036; H03M 13/13; H03M 7/3082; H04L 1/0057; G06Q 10/103; G06Q 10/101
See application file for complete search history.

(56) References Cited

U.S. PATENT DOCUMENTS

| | | |
|---|---|---|
| 10,740,469 B2 | 8/2020 | Zheng |
| 10,901,727 B2 | 1/2021 | Biddle |
| 2011/0320899 A1* | 12/2011 | Toyama ................ H04L 1/1819 |
| | | 714/748 |
| 2019/0332376 A1* | 10/2019 | Borra .................. G06F 11/3442 |
| 2021/0357206 A1 | 11/2021 | Karve |
| 2021/0370510 A1* | 12/2021 | Mao ....................... B25J 13/086 |

OTHER PUBLICATIONS

PT Tokopedia, "Pre-Merge Risk Analysis in Version Control", An IP.com Prior Art Database Technical Disclosure, IP.com No. IPCOM000267043D, IP.com Electronic Publication Date: Sep. 20, 2021, 6 pages.

\* cited by examiner

| Distance Between Blocks | Block 1 | Block 2 | Block 3 | Block 4 | Block 5 | ... | Block (n-1) | Block (n) |
|---|---|---|---|---|---|---|---|---|
| Block 1 | 0 | 5 | 1.1 | 1.6 | 1.1 | | 10 | 5 |
| Block 2 | 5 | 0 | 1.6 | 1.25 | 10 | | 10 | 3.3 |
| Block 3 | 1.1 | 1.6 | 0 | 5 | 1.25 | | 10 | 2.5 |
| Block 4 | 1.6 | 1.25 | 5 | 0 | 10 | | 10 | 1.4 |
| Block 5 | 1.1 | 10 | 1.25 | 10 | 0 | | 10 | 5 |
| ... | | | | | | | | |
| Block (n-1) | 10 | 10 | 10 | 10 | 10 | | 0 | 1.1 |
| Block (n) | 5 | 3.3 | 2.5 | 1.4 | 5 | | 1.1 | 0 |

…

AUTOMATED EVALUATION OF CODE DELIVERY

BACKGROUND

The present disclosure relates generally to the field of software development and DevOps, and more specifically toward pre-evaluation of code delivery during the DevOps process.

DevOps is the combination of cultural philosophies, practices, and tools that increases an organization's ability to deliver applications and services more quickly. The DevOps process can be implemented to improve products at a faster pace than organizations using traditional software development and infrastructure management processes. The increased speed of development enables organizations to better serve their customers and become more competitive. Under a DevOps model, instead of the development and operations teams being "siloed", these two teams can be merged into a single team where the engineers work across the entire application lifecycle (i.e., from development and testing to deployment to operations) allowing members of the team to develop a range of skills that are not limited to a single function.

DevOps may practice the implementation of very frequent but small updates, allowing organizations to innovate faster for their customers. The updates are often delivered in more incremental changes than the occasional updates performed under traditional release practices. Frequent but small updates make each deployment less risky. They help teams address bugs faster because teams can identify the last deployment that caused the error. Although the cadence and size of updates vary, organizations employing a DevOps model can deploy updates much more often than organizations using traditional software development practices.

Organizations might also use a microservices architecture to make their applications more flexible and enable quicker innovation. The microservices architecture decouples large, complex systems into simple, independent projects. Applications can be broken into individual components (services), with each service targeted toward a single purpose or function. The microservice operates independently of its peer services and the application as a whole. This architecture reduces the coordination overhead of updating applications. However, the combination of microservices and increased release frequency leads to significantly more deployments which can present operational challenges. As a result, DevOps practices operate as a continuous integration and continuous delivery mechanism to solve these issues in order to code deliver rapidly in a safe and reliable manner. Additionally, the use of monitoring and logging helps engineers track the performance of applications and infrastructure so the members of the DevOps team can react quickly to problems.

SUMMARY

Embodiments of the present disclosure relate to a computer-implemented method, an associated computer system and computer program products for automating evaluations of code delivery. The computer-implemented method comprises dividing a software project into a plurality of code blocks; calculating a correlation between pairs of the code blocks based on Euclidean Distance between each of the pairs of the code blocks; generating a mapping of the code blocks describing an original distance between the code blocks (an Original Distance Map), wherein the Original Distance Map comprises nodes representing each of the code blocks and an edge between the nodes having a distance corresponding to the Euclidean Distance calculated between the pairs of the code blocks; generating a Dynamic General Distance Map by dynamically scaling the distance between the nodes of the Original Distance Map based on a counting of commits over a period of time that have been applied to one or more of the pairs of the code blocks; and creating a Dynamic User Distance Map based on the Dynamic General Distance Map, by inserting a commit count for each of the nodes wherein a higher commit count for a node indicates an increased level of a user's familiarity with a code block corresponding to the node. Embodiments of the computer-implemented method can further comprise steps directed toward quantifying, by the processor, a code delivery distance representing a total distance of all of the code blocks within the code delivery; evaluating, by the processor, the code delivery distance for the code delivery using delivery assessment criteria, wherein the code delivery distance is greater than the delivery assessment criteria; and outputting, by the processor, an indication of a high level of risk is to a user.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

FIG. 5 depicts an example of embodiment depicting a table describing initial distances between a plurality of code blocks.

DETAILED DESCRIPTION

Figure 1:
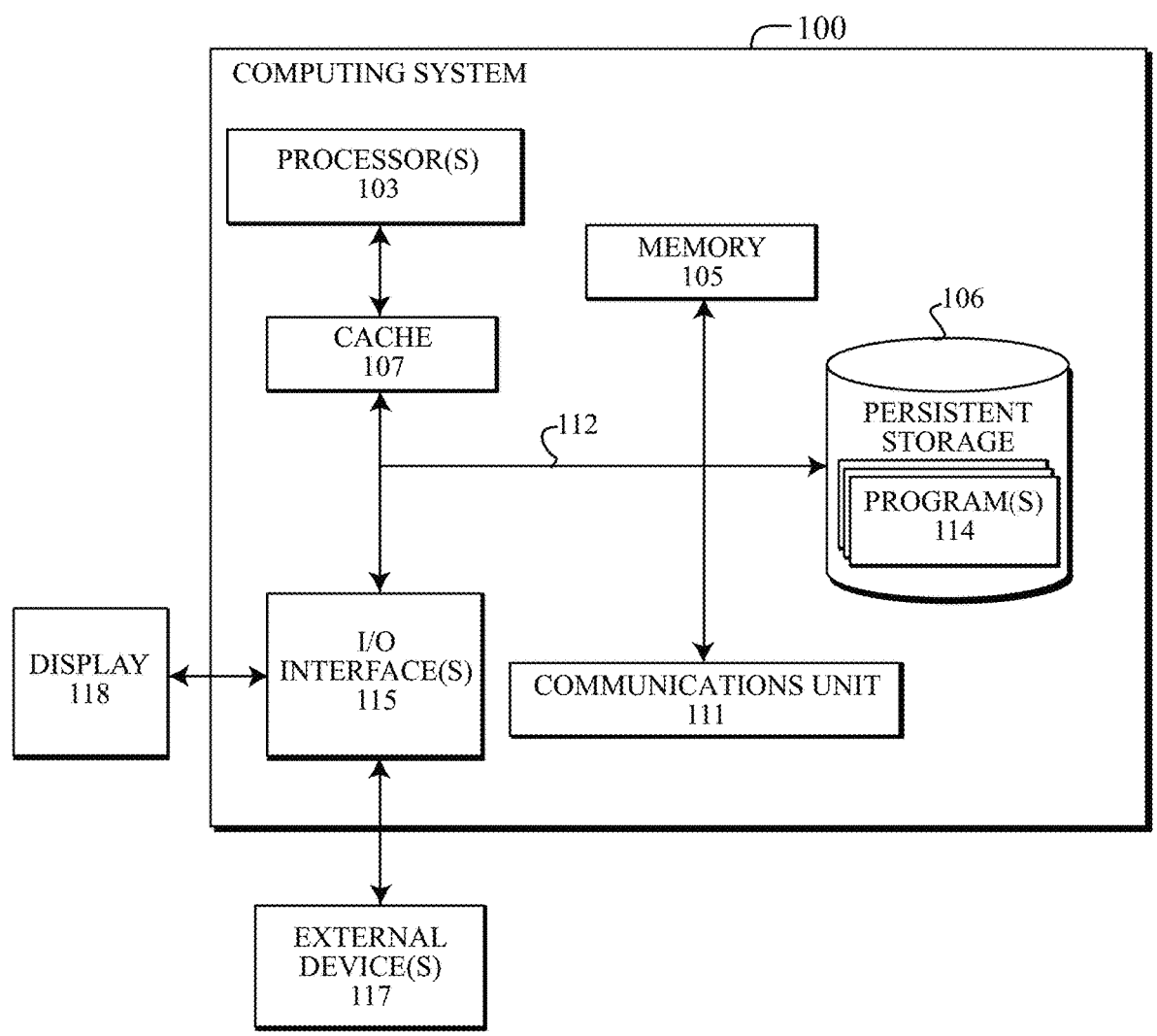
FIG. 1 depicts a block diagram illustrating an embodiment of a computing system and the internal and external components thereof, upon which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

During the DevOps process, there are generally two existing ways to evaluate the quality of code delivery in order to guarantee quality of the software product; code review and testing. Embodiments of the present disclosure recognize there are shortcomings to existing code evaluation processes. For example, code review relies too much on the individual skills and experience of the reviewers, and often it is difficult, even for the most experienced code reviewers to avoid errors from occurring when humans are manually reviewing code line by line. Moreover, existing testing procedures, such as a unit test and/or regression test, are often only applied to a portion of the delivered code. Testing all of the delivered code, for instance by performing a full regression test, can be time consuming and my not often be performed during the DevOps process. Existing code review and testing procedures may not always employ the best practices, and poor practices may not be easily avoided. For example, a user may be familiar with a first block of code being delivered as part of a code delivery but may not be familiar with the code of a second block of code that is also delivered with the first block. In view of a user's lack of familiarity with the second block of code, during the review of the delivered code, the reviewer's unfamiliarity with the second block can result in an increased likelihood of the reviewer not catching errors during review, thus producing error prone code. Moreover, even in situations where a user tasked with reviewing the code delivery is familiar with the first block of code and the second block of code, it may not be considered best practice to deliver the first and second code blocks together if they are directed toward completely different functions. Review of code blocks directed toward different functions can increase the complexity of the review and further increase the occurrence of errors that may result.

Embodiments of the present disclosure recognize that large projects (such as an open-source project) can include many developers and would benefit from being able to detect and avoid implementation of bad practices for delivering code. Embodiments of the present disclosure improve upon existing methods for evaluating delivered code and automate the evaluation process by automatically identifying risks associated with delivering unfamiliar code, risks associated with delivering code that operates across different functions of the software project and automatically recommending reviewers most familiar with the delivered code to perform reviews.

Embodiments of the present disclosure evaluate the code delivery by dividing the project into a plurality of code blocks as a function of analyzing the software code, a build file and/or build log. Attributes of the code blocks are extracted and one or more correlations between the code blocks is calculated, including a Euclidean distance between the code blocks. Embodiments may further calculate dynamic distance between code blocks. Using the Euclidean distance, and a history of code delivery for each user, a Dynamic General Distance Map for all users can be generated as well as and a Dynamic User Distance Map describing code blocks of individual users can be built up. Using the Dynamic User Distance Map, a code delivery distance can be quantified and evaluated. The code delivery distance can represent to total distance of all code blocks within a single code delivery (i.e., a commit operation) and indicates the difficulty and/or risk of delivering code across code blocks in a single delivery. For each user, delivery assessment criteria can be applied to evaluate the code delivery distance and determine the risk levels to a user responsible for reviewing code that is being delivered. When the code delivery distance exceeds the delivery assessment criteria, a high-risk value may be assigned to the code delivery indicating that the code delivery may be high risk for errors and/or not provided in compliance with best practices. The high-risk label of the code delivery may indicate to users responsible for reviewing/testing the code to pay more attention to the code blocks of the code delivery during the review and testing phases of the DevOps process.

Computing System

The present invention may be a system, a method, and/or a computer program product at any possible technical detail level of integration. The computer program product may include a computer-readable storage medium (or media)

having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram describing an embodiment of a computing system 100, which may be a simplified example of a computing device (i.e., a physical bare metal system and/or a virtual system) capable of performing the computing operations described herein. Computing system 100 may be representative of the one or more computing systems or devices implemented in accordance with the embodiments of the present disclosure and further described below in detail. It should be appreciated that FIG. 1 provides only an illustration of one implementation of a computing system 100 and does not imply any limitations regarding the environments in which different embodiments may be implemented. In general, the components illustrated in FIG. 1 may be representative of any electronic device, either physical or virtualized, capable of executing machine-readable program instructions.

Although FIG. 1 shows one example of a computing system 100, a computing system 100 may take many different forms, including bare metal computer systems, virtualized computer systems, container-oriented architecture, microservice-oriented architecture, etc. For example, computing system 100 can take the form of a desktop computer system or workstation, laptops, notebooks, tablets, servers, client devices, network devices, network terminals, thin clients, thick clients, kiosks, mobile communication devices (e.g., smartphones), multiprocessor systems, microprocessor-based systems, minicomputer systems, mainframe computer systems, smart devices, and/or Internet of Things (IoT) devices. The computing systems 100 can operate in a local computing environment, networked computing environment, a containerized computing environment comprising one or more pods or clusters of containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and/or cache 107 memory. In general, memory 105 can include any suitable volatile or non-volatile computer-readable storage media and may comprise firmware or other software programmed into the memory 105. Program(s) 114, application(s), processes, services, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 or application(s) can be loaded into persistent storage 106.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

Figure 2:
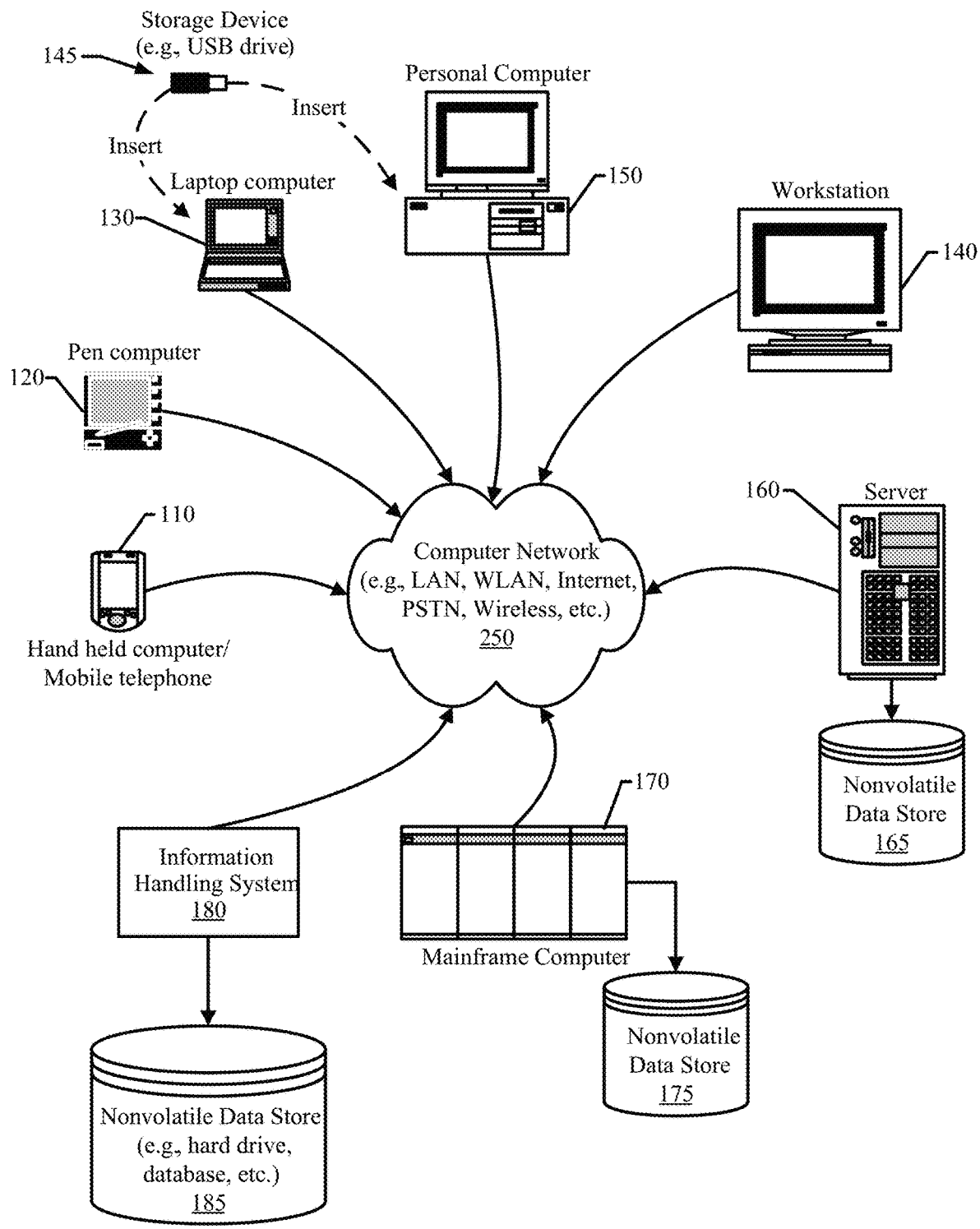
FIG. 2 depicts a block diagram illustrating an extension of the computing system environment of FIG. 1, wherein the computing systems are configured to operate in a network environment and perform methods described herein in accordance with the present disclosure.

FIG. 2 provides an extension of the computing system 100 environment shown in FIG. 1 and further illustrates that the methods described herein can be performed on a wide variety of computing systems that operate in a networked environment. Types of computing systems 100 may range from small handheld devices, such as handheld computer/mobile telephone 110 to large mainframe systems, such as mainframe computer 170. Examples of handheld computer 110 include personal digital assistants (PDAs), personal entertainment devices, such as Moving Picture Experts Group Layer-3 Audio (MP3) players, portable televisions, and compact disc players. Other examples of information handling systems include pen, or tablet computer 120, laptop or notebook computer 130, workstation 140, personal computer system 150, and server 160. Other types of information handling systems that are not individually shown in FIG. 2 are represented by information handling system 180.

Many of the computing systems can include nonvolatile data stores, such as hard drives and/or nonvolatile memory. The embodiment of the information handling system shown in FIG. 2 includes separate nonvolatile data stores (more specifically, server 160 utilizes nonvolatile data store 165, mainframe computer 170 utilizes nonvolatile data store 175, and information handling system 180 utilizes nonvolatile data store 185). The nonvolatile data store can be a component that is external to the various computing systems or can be internal to one of the computing systems. In addition, removable nonvolatile storage device 145 can be shared among two or more computing systems using various techniques, such as connecting the removable nonvolatile storage device 145 to a USB port or other connector of the computing systems. In some embodiments, the network of computing systems 100 may utilize clustered computing and components acting as a single pool of seamless resources when accessed through network 250 by one or more computing systems. For example, such embodiments can be used in a datacenter, cloud computing network, storage area network (SAN), and network-attached storage (NAS) applications.

As shown, the various computing systems 100 can be networked together using computer network 250 (referred to herein as "network 250"). Types of networks 250 that can be used to interconnect the various information handling systems include Local Area Networks (LANs), Wireless Local Area Networks (WLANs), home area network (HAN), wide area network (WAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 100.

System for Automating Evaluations of Code Delivery

It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Figure 3:
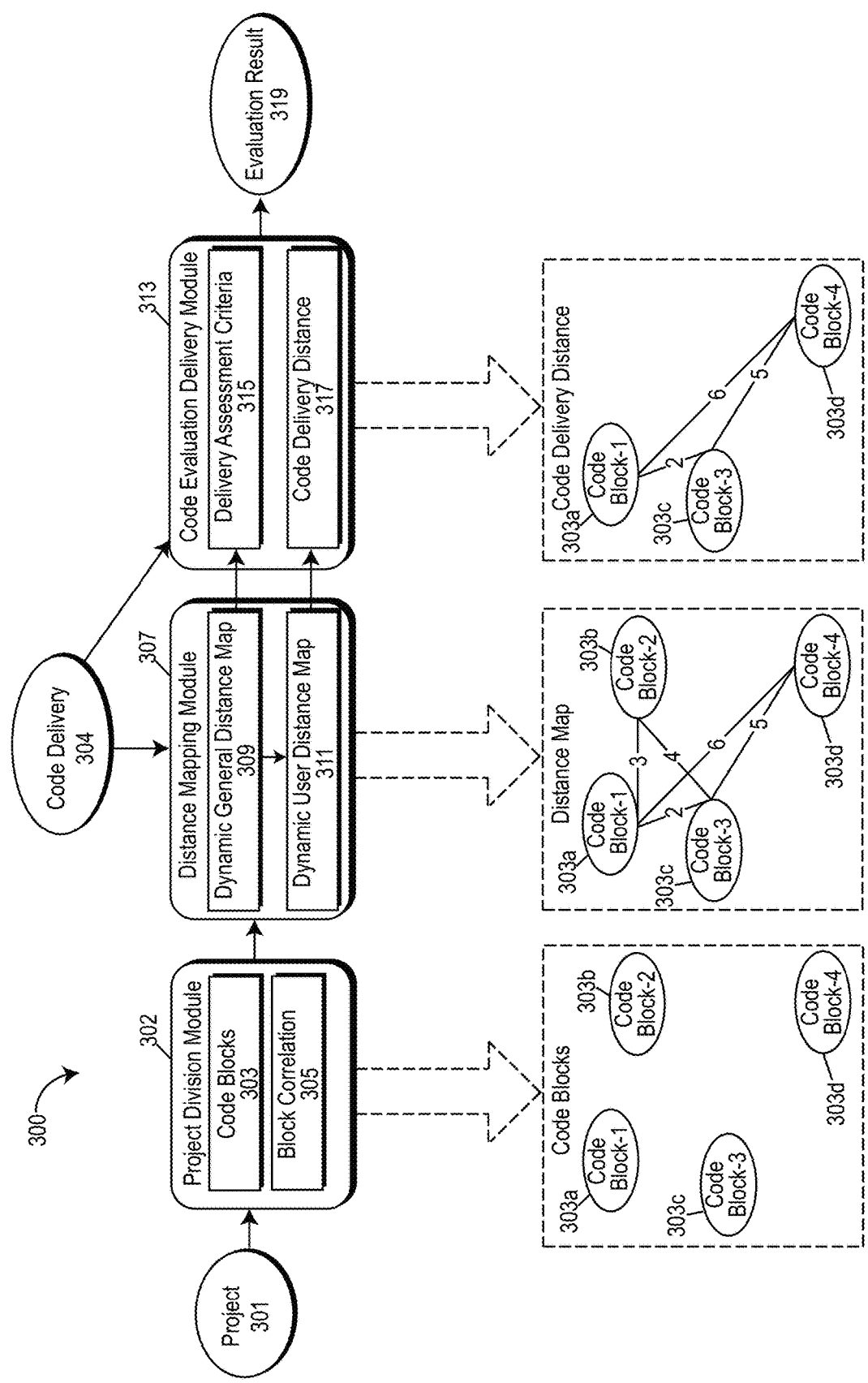
FIG. 3 depicts a block diagram illustrating an embodiment of a computing environment configured to automate evaluations of code delivery in accordance with the present disclosure.

Referring to the drawing of FIG. 3, computing environment 300 illustrates an overview of an exemplary embodiment for automating evaluations of code deliveries for one or more software project 301. As illustrated, the computing environment 300 may be comprised of a project division module 302, a distance mapping module 307 and/or a code evaluation delivery module 313. The term "module" may refer to a hardware module, software module, or a module may be a combination of hardware and software resources. A module (whether hardware, software or a combination thereof) may be designed to implement or execute one or more specific tasks, routines or functions. Embodiments of hardware-based modules may include self-contained components such as chipsets, specialized circuitry, one or more memory 105 devices and/or persistent storage 106. A software-based module may be part of a program 114, program code or linked to program code comprising a set of specific programmed instructions loaded into a memory 105 device or persistent storage 106 device.

Figure 4A:
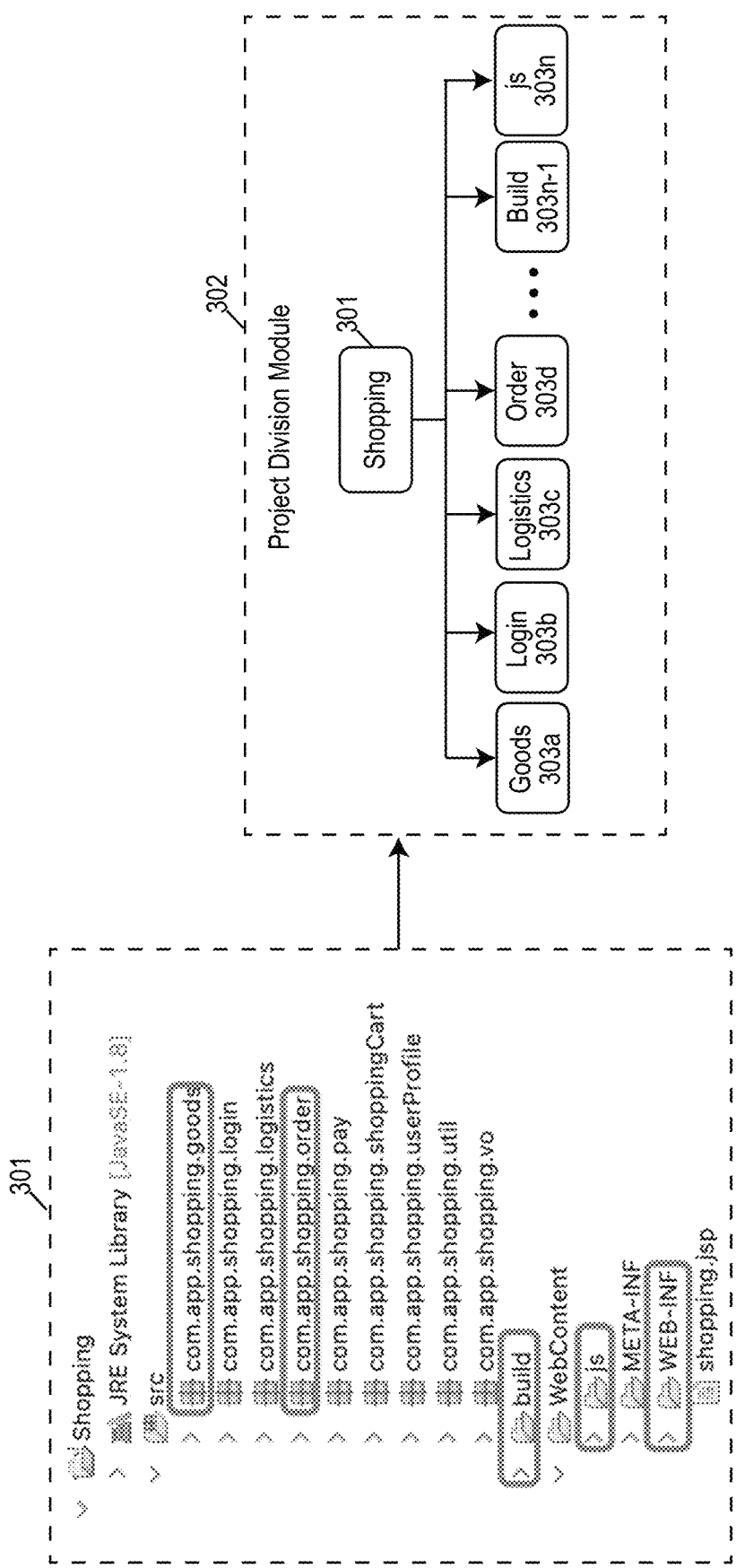
FIG. 4A illustrates a block diagram depicting an example of a software project being divided into a plurality of code blocks based on physical structure of the code and/or project configuration files, in accordance with the present disclosure.

Embodiments of the project division module 302 may perform functions, tasks and/or processes of the computing environment 300 directed toward the division of a selected project 301 into a plurality of code blocks 303. The project division module 302 may perform the segmentation of the software project 301 into code blocks 303 based on the physical structure of the project's code, and/or the configuration files of the project 301 whose code is being delivered and evaluated. For example, as shown in the overview of FIG. 3, project 301 is shown to be divided into code block-1 303a, code block-2 303b, code block-3 303c and code block-4 303d. FIG. 4A describes one exemplary method for dividing a project 301 into a plurality of code blocks 303a-303d, 303n-1, 303n, wherein "n" may refer to the last code block 303 within a series of code blocks 303 of a project, and "n-1" may refer to the penultimate code block 303 in the series of code blocks 303. The number of code blocks 303 that a project 301 may be divided or segmented into may vary based on the content of the project 301. A project 301 may be divided into any number of code blocks 303 and the final number of code blocks 303 may depend on the organization of the project, the physical structure of the code and/or the configuration files.

In the example depicted in FIG. 4A, a "shopping" project 301 is shown to be divided into a plurality code blocks 303 corresponding to the physical structure of the project's code. The divisions into different code blocks 303 include code blocks 303 corresponding to the packages of source code within the SRC directory, as well as the directories of other portions of the project 301. For instance, the "goods" code block 303a may correspond to the "com.app.shopping-.goods" package, while the "login" block 303b corresponds to the com.app.shopping.login package, the "logistics" block 303c corresponds to com.app.shopping.login package and the "order" code block 303d includes the com.app.shopping.order package. Moreover, the build directory of the project 301 can be included in the "build" code block 303n-1, whereas the "js" directory is included is part of code block 303n.

Figure 4B:
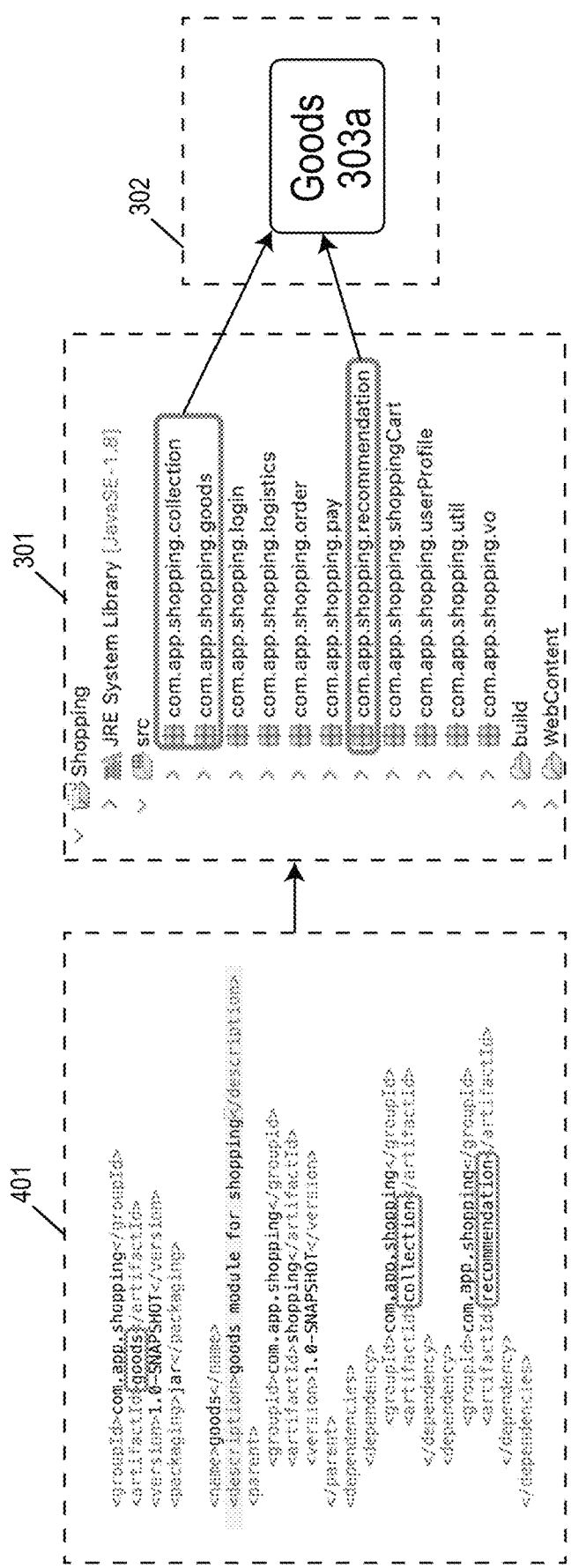
FIG. 4B illustrates a block diagram depicting an example of identifying a portion of software code belonging to a code block based on the physical structure of the code, including dependencies, in accordance with the present disclosure.

Division or segmentation of a project 301 into code blocks 303 by the project division module 302 may not always be a one-to-one correlation of a project file, package of code or directory within a project 301. In some instances, where the project code includes dependencies or other features that may be interconnected by a section of code, the project division module 302 may treat the interconnected sections of code as being part of the same code block 303. For example, as shown in FIG. 4B, a portion of code 401 from project 301 describes the "goods" package (com.app-.shopping.goods) as being dependent upon the "collection" package (com.app.shopping.collection) and the "recommendation" package (com.app.shopping.recommendation) of the project 301. As a result of the code structure, which programs the shopping project 301 in such a manner that the goods, collection and recommendation packages of the project 301 are dependent one another, then by virtue of the goods package being dependent upon the collection and recommendation packages, the project division module 302 may organize all three packages into the same code block 303. In this particular example, the goods, collection and recommendation package are part of the "goods" code block 303a, by the project division module 302, instead of organizing the three separate code packages into separate code blocks 303.

Embodiments of the project division module 302 may further perform the function or task of calculating block correlations 305 between the code blocks 303 identified from the division of project 301. As part of the block correlation 305 process, the project division module 302 may perform a feature extraction which may extract one or more key features from each of the code blocks 303. In some embodiments, the project division module 302 may perform feature selection of the most relevant attributes of each code block 303 and/or principal component analysis (PCA) of each code block 303 where feature extraction has occurred. Key features extracted from the code blocks 303 may include features such as the development language of the code, package dependencies, the call relationships between objects or classes of objects described by the extracted features of the code blocks 303, as well as copyright information, package descriptions, developer information and/or code style, etc.

Correlations between code block pairs (i.e., two code blocks 303) can be performed by calculating the Euclidean Distance between each of the code block pairs. The initial distance which may also be referred to as the original distance (OriDis) between code blocks of each code block pair may be calculated using the following formula (1):

$$OriDis_{(m,n)} = \sqrt{\sum_{i=1}^{k}(m_i - n_i)^2} \quad (1)$$

wherein $OriDis_{(m,n)}$ is the distance between the first code block (i.e., $CodeBlock_m$) of a code block pair, and a second code block (i.e., $CodeBlock_n$) of the code block pair, and k represents a number of attributes for each code block 303, identified during feature extraction, selection and/or PCA of the code blocks 303. Using the Euclidean Distance calculated for each of the code block pairs, an original distance between each of the code blocks 303 can found and stored. For example, as exemplified in FIG. 5, table 500 depicts original distances calculated by the project division module 302 for each of the possible code block pairs of project 301. Original distances calculated by the project division module 302 may be outputted to the distance mapping module 307. For example, by outputting a table such as table 500 comprising the block correlations 305 comprising original distances for each of the pairs of code blocks 303 of project 301.

Figure 6A:
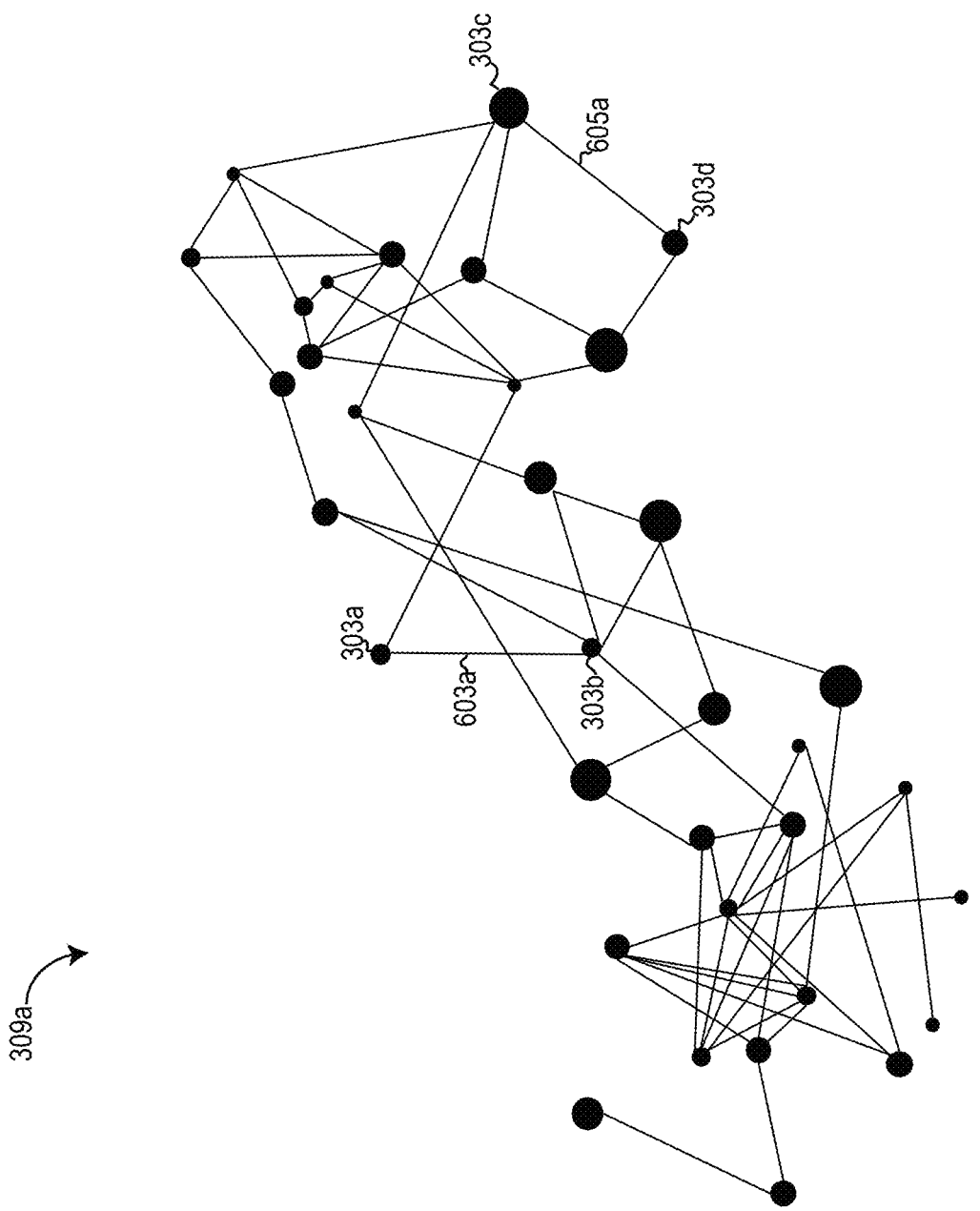
FIG. 6A illustrates an example of an embodiment of an "Original Distance Map" depicting code blocks of a software project as nodes, and the edges between the nodes representing initial distances between the code blocks.

Embodiments of the distance mapping module 307 may perform functions, tasks and/or processes associated with creating, generating and/or updating one or more distance maps, including, but not limited to an Original Distance Map, a Dynamic General Distance Map 309 and/or a Dynamic User Distance Map 311. Using the original distances calculated by the project division module 302, embodiments of the distance mapping module 307 may initialize an Original Distance Map for the project 301. FIG. 6A illustrates an example of an Original Distance Map 309a. As shown, Original Distance Map 309a comprises a plurality of nodes corresponding to each of the code blocks 303 as well as edges connecting each of the nodes. The length of the edges connecting nodes correspond to the original distance calculated by the project division module 302. For example, a pair of code blocks, code block 303a and 303b are represented in the Original Distance Map 309a as being connected by an edge 603a expanding the original distance (i.e., $OriDis_{(m,n)}$) of a length between code block 303a and code block 303b as illustrated. A plurality of code blocks 303 may be interconnected through a web of interconnected nodes representing code blocks 303 to form the Original Distance Map 309a for software project 301. For example, a second code block pair 303c, 303d comprises code block 303c connected to code block 303d. Code blocks 303c, 303d are connected by edge 605a which extends an original distance between the code blocks 303c, 303d as shown, which may be longer or shorter than the original distance of the edge 603a connecting code blocks 303a, 303b.

Embodiments of the distance mapping module 307 can dynamically scale an Original Distance Map based on historical code delivery 304 of all users of project 301, in order to generate a Dynamic General Distance Map. The lengths of edges 603, 605 between nodes of the Dynamic General Distance Map can be dynamically increased or decreased. A general distance (GenDis) of the Dynamic General Distance Map 309 may be the length of the edge connecting a pair of nodes representing a corresponding pair code blocks 303 dynamically scaled in accordance with the history of code deliveries for the pair of code blocks 303. For example, as code blocks 303 within a pair of code blocks are changed as part of the same code commit, the general distance of the edge connecting the nodes can be decreased, bringing the nodes closer together on the Dynamic General Distance Map 309. Conversely, if the historical code delivery 304 indicates that only one of the code blocks 303 within a code block pair is change frequently (i.e., a threshold number of times within a set time period) or code commits for code blocks 303 are occurring at a time interval that exceeds a threshold period of time, then the length of the edge connecting the two nodes representing the code blocks can increase in length.

A general distance (GenDis) between two code blocks 303 of a code block pair may be calculated using formula (2):

$$GenDis(m,n) = \alpha * OriDis(m,n) + (1-\alpha) * OriDis(m,n) * e^{-\lambda * CommitCount_{(m,n,t)}} \quad (2),$$

wherein $\alpha$ is a number between 0 and 1, $\lambda$ is a positive number, $OriDis(m,n)$ is the original distance corresponding to the Euclidean Distance calculated between a first node and a second node representing the pairs of the code blocks in the Original Distance Map, and $CommitCount_{(m,n,t)}$ is a counting of a number of commits over the period of time that are applied to both the first code block and the second code block of the code block pair.

Figure 6B:
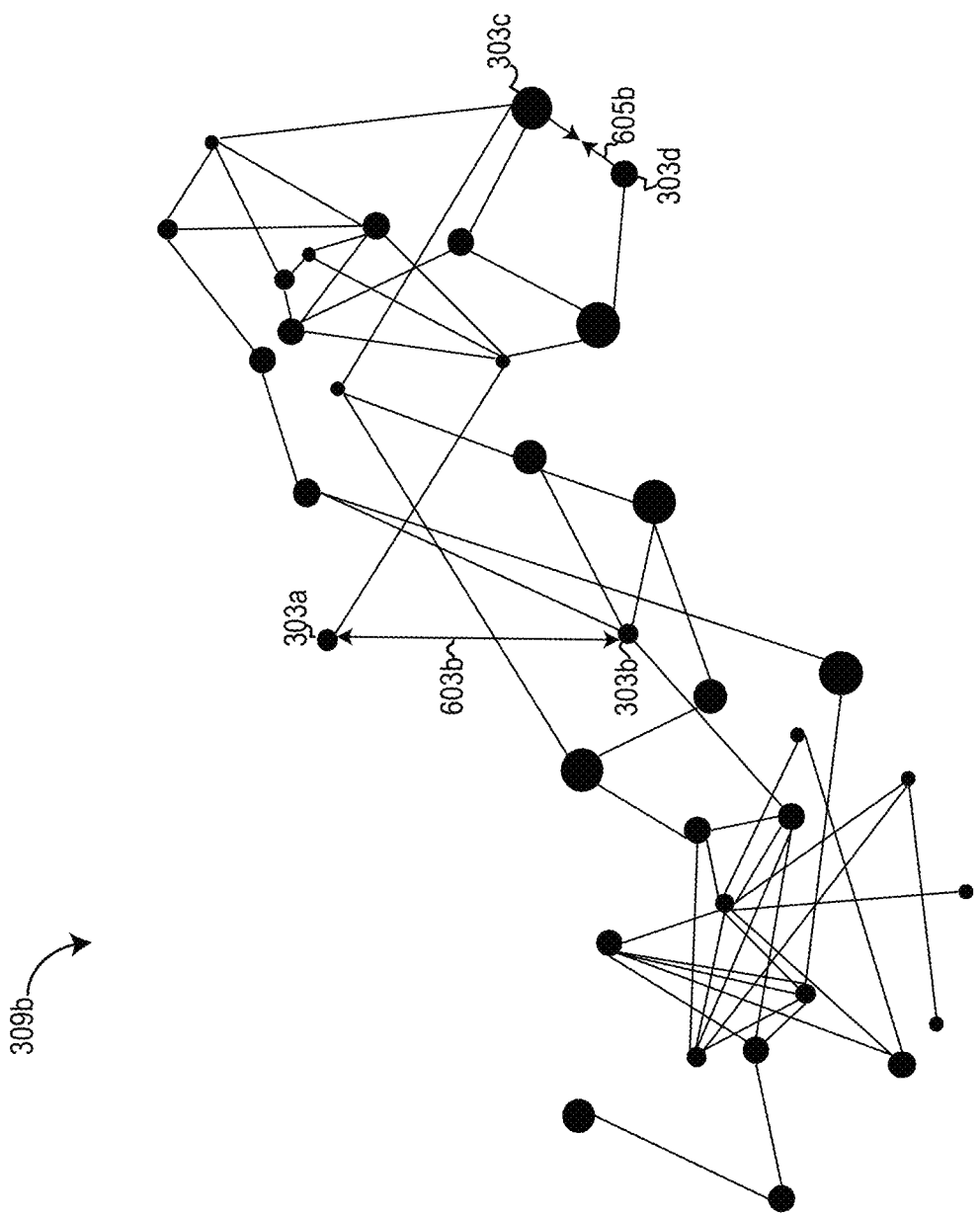
FIG. 6B illustrates an example of an embodiment of a "Dynamic General Distance Map" depicting code blocks of a software project as nodes, and the edges between the nodes representing distances between the code blocks dynamically scaled based on code delivery history of all users.

FIG. 6B depicts an example of a Dynamic General Distance Map 309b illustrating dynamic scaling of the length of edges 603b, 605b compared with edges 603a, 605a of the Original Distance Map 309a. In the first code block pair comprising nodes representing code blocks 303a, 303b the length of the edge 603b is increasing in length compared to the original distance of edge 603a of the Original Distance Map 309a. The increasing in length of edge 603b increases the distance between nodes, indicating a history of code delivery 304 whereby either code blocks 303a, 303b are not being changed as part of the same commit within a threshold period of time, or either code block 303a or code block 303b are frequently being changed without changing the other code block, thus resulting in an overall increase in the general distance between the nodes on the Dynamic General Distance Map 309b. The opposite scaling effect is shown in FIG. 6B with regards to the code block pair comprising code blocks 303c and 303d. As shown, the general distance between the code blocks 303c, 303d is decreasing in distance as edge 605b shortens in length compared with edge 605a of the Original Distance Map 309a. As noted above, the shortening of the general distance between the nodes occurs as the history of code delivery 304 indicates that code commits are occurring for both code blocks 303 of a pair. In this Example, code blocks 303c, 303d are being changed within the same code commit resulting in nodes of the Dynamic General Distance Map 309 moving closer together as edge 605b decreases in length.

Embodiments of the distance mapping module 307 may further construct a Dynamic User Distance Map 311 based upon Dynamic General Distance Map 309. Whereas the Dynamic General Distance Map 309 may adjust distances between nodes based on historical code deliveries 304 for all users, the Dynamic User Distance Map 311 may adjust distance between code blocks 303 based on a number of commits for each code block 303 by a specific user, thus indicating the user's level of familiarity with each of the specific code blocks of the project 301. In order to generate a Dynamic User Distance Map 311, commit counts 620 for each code block 303 are added to the Dynamic General Distance Map 309. Higher commit counts indicate an increased level of user familiarity with a code block 303, whereas fewer code blocks 303 indicate a decreased level of user familiarity. Distances between code blocks 303 decrease as a user become more familiar with one or more code blocks 303, whereas distances between code blocks may increase if commit counts 620 for one or more code blocks 303 decrease. For example, a decrease in commit count 620 may occur when a code block is not part of a code commit for a period of time that exceeds a threshold period of time. For example, if the threshold period of time for a code commit is 1 month, then each time a code block has gone a month without a single code commit, the code commit count 620 for the code block 303 may decrease by one count.

A user distance (UserDis) between code blocks 303 of the Dynamic User Distance Map 311 can be calculated using formula (3) described below:

$$\text{UserDis}(m,n) = \beta * \text{GenDis}_{(m,n)} + (1-\beta) * \text{GenDis}_{(m,n)} * e^{-k * \text{CommitCount}_{(m,t)} * \text{CommitCount}_{(n,t)}} \quad (3),$$

wherein β is a number between 0 and 1, k is a positive number, $\text{CommitCount}_{(m,t)}$ is a commit count of a first code block over a period of time and $\text{CommitCount}_{(n,t)}$ is a commit count of a second code block over the same period of time.

Figure 6C:
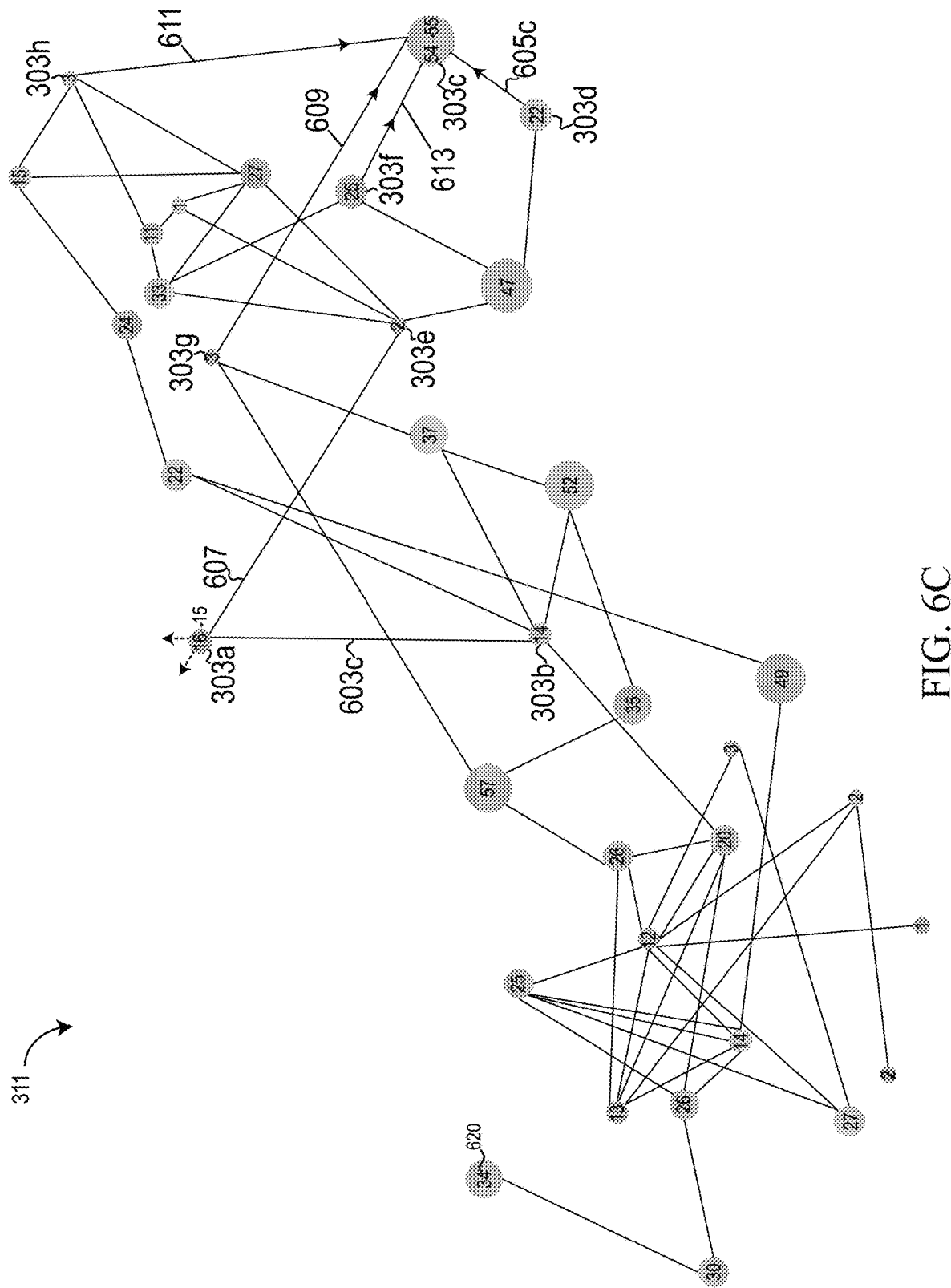
FIG. 6C illustrates an example of an embodiment of a "Dynamic User Distance Map" depicting code blocks of a software project as nodes, commit counts for each code block indicating user familiarity with code block and the edges between the nodes representing distance between the code blocks, updated based on increases and/or decreases in commit counts, in accordance with present disclosure.

FIG. 6C depicts an example of a Dynamic User Distance Map 311 depicting instances where the commit counts 620 of code blocks 303 are increasing and/or decreasing, and the effects of such change on the Dynamic User Distance Map 311 as a result of changes to the commit count 620. As shown in FIG. 6C, the user's familiarity with code block 303a decreases, as exemplified by the decrease in commit count 620 from 16 to 15 commits. In response to the decrease in the commit count, a change in the distance between the two code blocks is observed. First, an increase in the length of edge 603c is observed, increasing the user distance between code block 303a and code block 303b. Moreover, in response to the decrease in commit count 620 for code block 303a, an increase in the length of edge 607 is also observed. As a result of lengthening edge 607, the user distance between code block 303a and code block 303e also increases. Likewise, the opposite effect on the user distance is observed for code block 303c and connected code blocks thereto, as a result of the commit count 620 increasing from 54 commits to 55 commits. For example, the edge 605c connecting code block 303d to code block 303c shortens, decreasing the user distance between the code blocks 303c, 303d. Moreover, the effects are observed on other connected code blocks that are attached by edges to code block 303c. For instance, the edges 609, 611 and 613 also decrease in length resulting in a reduction to the user distance between code blocks 303f, 303g, 303h and code block 303c.

Embodiments of the code evaluation delivery module 313 may perform the functions, tasks and/or processes associated with quantifying code delivery distance 317, calculating delivery assessment criteria 315, evaluating the code delivery distance 317 based on the delivery assessment criteria 315 and outputting evaluation results 319 to users. Using the Dynamic User Distance Map 311, code delivery can be quantified by the embodiments of the code evaluation delivery module 313 as a code delivery distance 317. The code delivery distance 317 may represent a total distance of all of the code blocks 303 within a single code delivery (i.e., a code commit). The value of the code delivery distance 317 may indicate an amount of difficulty and/or risk associated with delivering code across multiple code blocks 303 within one code delivery. A lower value of a code delivery distance 317 may represent a lower risk or difficulty associated with delivering code across the multiple code blocks 303 of the code delivery, whereas a higher value of the code delivery distance may indicate a higher level of difficulty or risk.

Figure 7A:
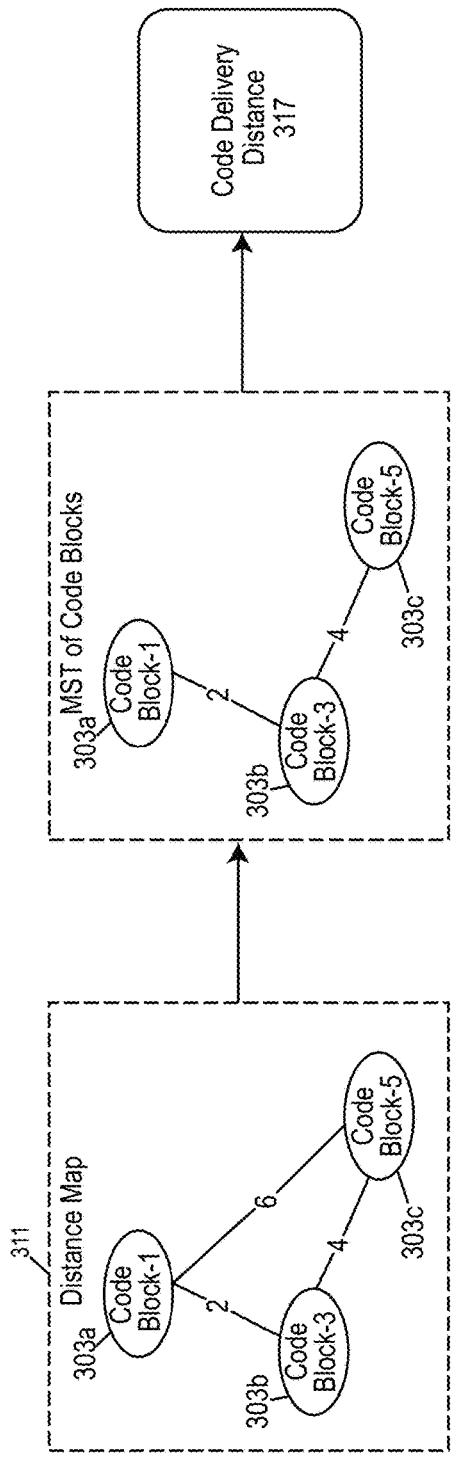
FIG. 7A illustrates an example of an embodiment of a code evaluation delivery module using a Dynamic User Distance Map to quantify a code delivery distance representing a total distance of all code blocks delivered in a single code delivery.
Figure 7B:
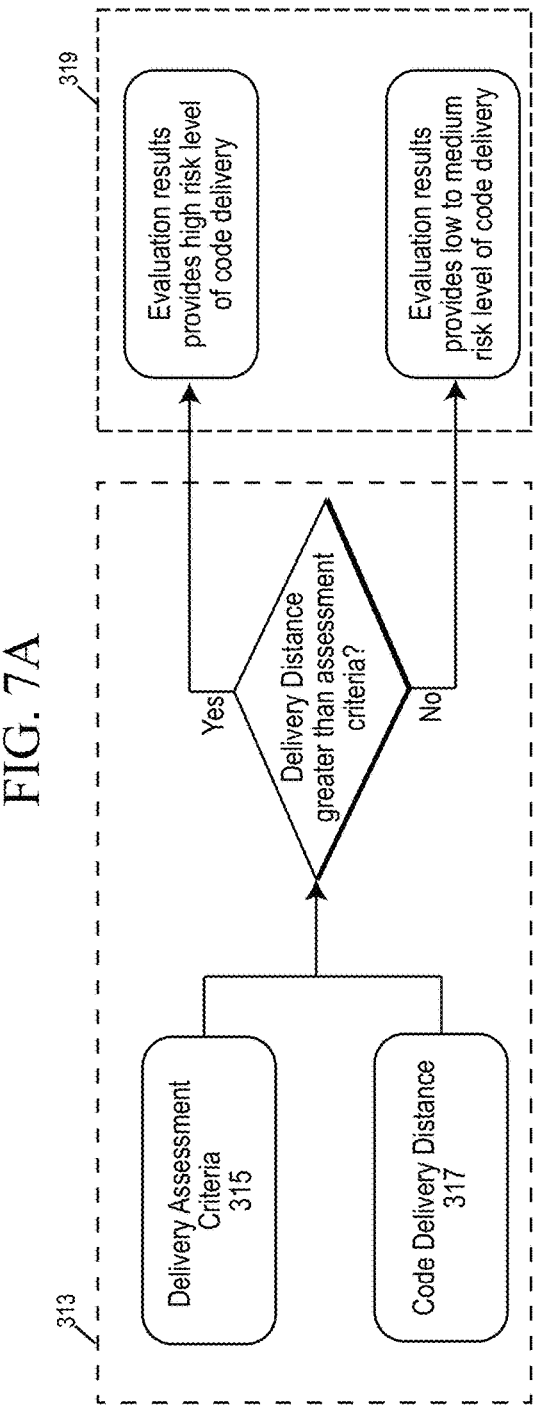
FIG. 7B illustrates an example of an embodiment of a code evaluation delivery module evaluating a risk associated with a code delivery using delivery assessment criteria and the code delivery distance, in accordance with the present disclosure.

Embodiments of the code evaluation delivery module 313 may use a Minimum Spanning Tree (MST) to calculate the code delivery distance 317. An MST may be described as a subset of the edges of a connected, edge-weighted directed or undirected graph that connects all the vertices together, without any cycles and with the minimum possible total edge weight. It is a spanning tree whose sum of edge weights is as small as possible. Embodiments of the code evaluation delivery module 313 may use an MST of the nodes and lengths or weights of edges from the Dynamic User Distance Map 311 that includes the nodes and edges of code blocks 303 being committed to find the code delivery distance. For example, FIG. 7A depicts three connected code blocks 303 of a Dynamic User Distance Map 311. The code blocks 303 include a first code block 303a, a second code block 303b and a third code block 303c. Each of the code blocks 303 as shown in this example are connected by an edge having a length or weight. As shown, the edge between the first code block 303a and the second code block 303b has a length or weight of 2. The edge connecting the first code block 303a and the third code block 303c has a length or weight of 6, and the edge connecting the second code block 303b to the third code block 303c has a length or weight of 4. As shown in FIG. 7A, the minimum length of the edges that connect all three code blocks 303a, 303b, 303c is calculated by creating an MST that follows the Dynamic User Distance Map 311 using the shortest path. In this example, the shortest path that extends to all three code blocks 303a, 303b, 303 is the path from first code block 303a to the second code block 303b and from the second code block 303b to the third code block 303c. The resulting code delivery distance 317 in this example is therefore the summation of the edge lengths or weights of 2+4 which equals a total of 6. This is opposed to the opposite path of the Dynamic User Distance Map 311 extending from the first code block 303a to the third code block 303c and from the third code block 303c to the second code block 303b, which has a value of 10 and is therefore not the shortest path (6<10).

Using the shortest path of the MST for the code delivery distance 317, the code evaluation delivery module 313 can use delivery assessment criteria 315 to evaluate the code delivery distance 317 for each user. Delivery assessment criteria 315 may be calculated using formula (4) which recites as follows:

$$\text{Delivery Assessment Criteria} = \text{Initial step length} + \text{Dynamic step length}(time, commit\ counts) \qquad (4)$$

wherein the "initial step length" may be a predefined value or calculated from the Dynamic General Distance Map 309, for example using an MST to calculate the minimum weight or length of edges along a pathway within a Dynamic General Distance Map 309 of all code blocks 303 included as part of the code delivery divided by the number of code blocks minus 1. The dynamic step length may consider historical code deliveries to the code blocks 303 involved in the code delivery being performed. For example, by using the code commits of the Dynamic User Distance Map 311, whereby the dynamic step length value increases as an increasing number of historical code commits for the code blocks 303 of the code delivery occur within the specified period of time, and the dynamic step length value decreases as code commits for the code blocks 303 of the code delivery do not occur within the specified period of time.

Embodiments of the code evaluation delivery module 313 may evaluate the code delivery distance 317 in view of the delivery assessment criteria 315 to generate and output evaluation results 319 describing the risk levels of the code delivery. If the value of the code delivery distance 317 exceeds the value of the delivery assessment criteria, the code evaluation delivery module 313 can output evaluation results 319 to the user indicating the code delivery incurs a "high" risk level to the users. A "high" risk level outputted by the evaluation results 319 may indicate that the code delivery may be high-risk or that the code delivery does not follow best practices. Embodiments of the evaluation results 319 may provide additional guidance to users in charge of reviewing and/or testing the delivered code as part of the DevOps process. For example, the evaluation results may caution a user to pay more attention during the review because errors are more likely to be present within the delivered code. Moreover, in situations where the code delivery distance 317 value does not exceed the value of the delivery assessment criteria 315, a lower risk level may be identified as part of the evaluation results 319. For example, if the code delivery distance 317 is between a threshold level and the delivery assessment criteria 315 value, the code evaluation delivery module 313 may assign a risk level of "medium" to the code delivery. Likewise, if the code delivery distance 317 is below the delivery assessment criteria 315 and below a threshold level that is less than the delivery assessment criteria 315, then the evaluation results 319 may indicate that the code delivery is a low-risk code delivery.

In some embodiments, the code evaluation delivery module 313 may further identify and include as part of the evaluation results 319, a recommended reviewer to review the code being delivered as part of the code delivery. Identification of reviewers most familiar with the code blocks 303 to review the code delivery may vary depending upon the number of code blocks 303 being delivered. For example, if multiple code blocks are being delivered, the code evaluation delivery module 313 may evaluate users using an MST of the code blocks 303 that are a part of the code delivery in each user's Dynamic User Distance Map 311. The user with the shortest MST length or weights of the edges being connected by the code blocks 303 within the code delivery may be identified as a recommended reviewer by the evaluation results 319 and/or may automatically be assigned to review and/or test the code being delivered. In other instances, a delivery may only contain a single code block being updated and delivered as part of the code delivery. In such an instance, a distance or radius around the code block being delivered can be selected and applied to each user's Dynamic User Distance Map 311. The code evaluation delivery module 313 may count the number of nearby code blocks 303 that fall within the area of the radius surrounding the code block 303. The code evaluation delivery module 313 may identify a recommended reviewer within the evaluation results 319 based on the user with the greatest number of nearby code blocks within the selected radius or distance of the code block 303 being delivered.

Method for Automating Evaluation of Code Delivery

Figure 8:
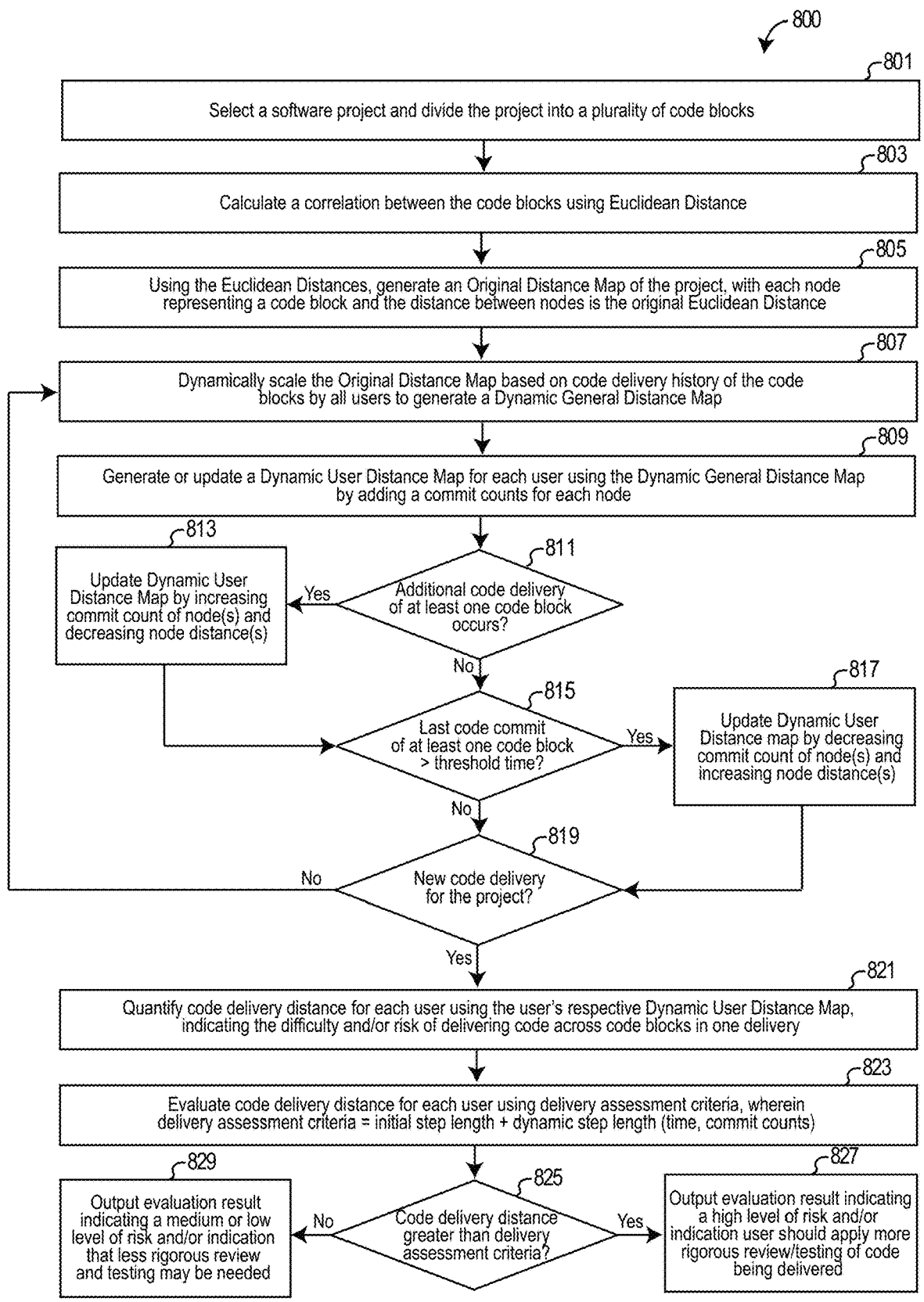
FIG. 8 depicts a flow diagram describing an embodiment of a method for automating evaluations of code delivery, in accordance with the present disclosure.
Figure 9:
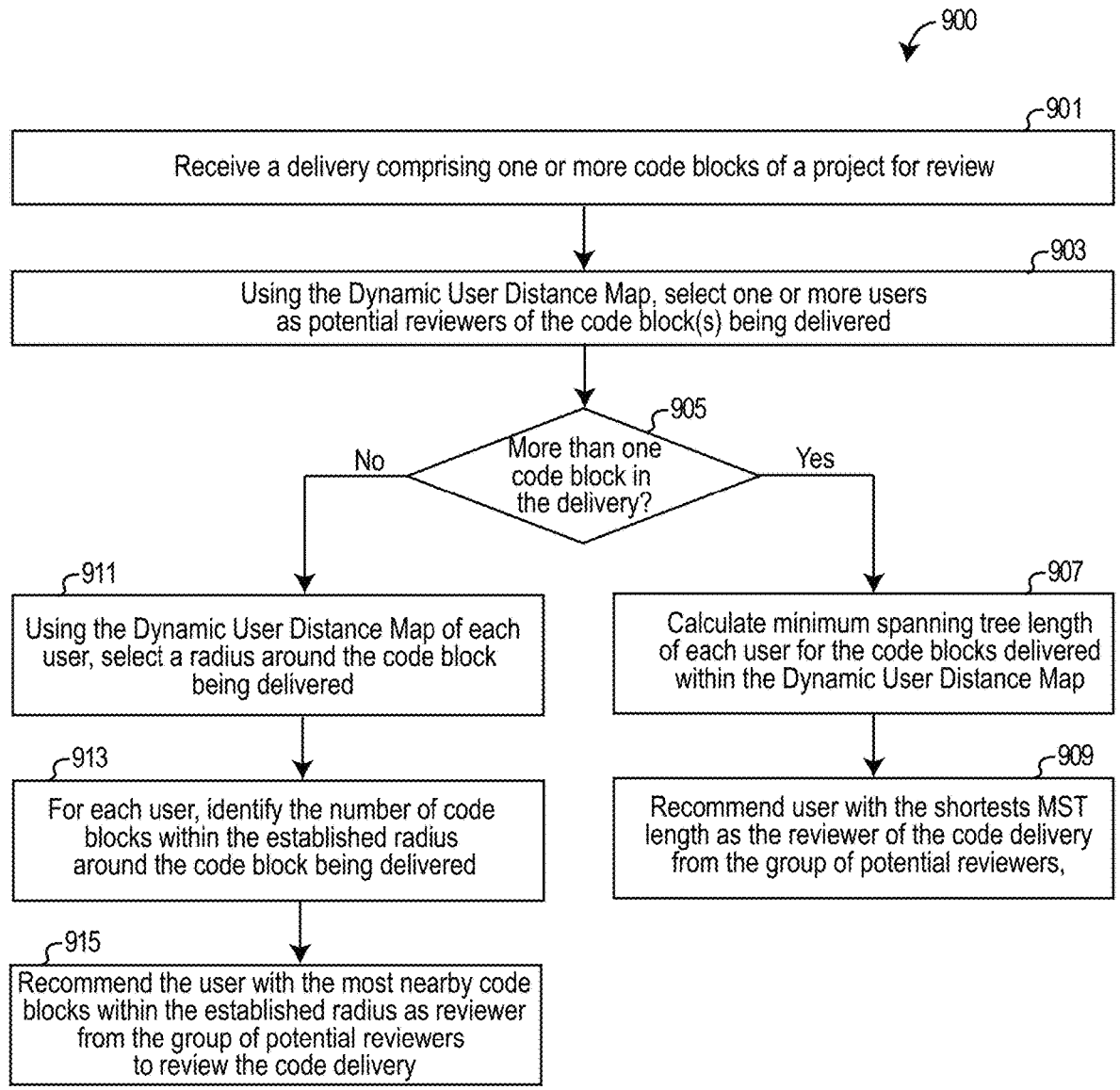
FIG. 9 depicts a flow diagram describing an embodiment of a method for recommending a code reviewer identified as most familiar with the code blocks being delivered, in accordance with the present disclosure.

The drawing of FIG. 8-9 represents embodiments of methods for automating evaluation of code delivery, in accordance with FIGS. 3-7B described above, using one or more computing systems defined generically by computing system 100 of FIGS. 1-2; and more specifically by the embodiments of the specialized systems and/or computing environments depicted in FIGS. 3-7B and as described herein. A person skilled in the art should recognize that the steps of the method described in FIGS. 8-9 may be performed in a different order than presented and may not require all the steps described herein to be performed.

The embodiment of method 800 described by FIG. 8 may begin at step 801. During step 801 a software project 301 may be selected for automated evaluation of code deliveries being committed by users and/or developers of the project 301. The selected project 301 may be inputted into the project division module 302, whereby the project division module 302 may divide the project 301 into code blocks 303 based on configuration files of the project 301 and/or the physical structure of the code that comprises the project 301. In step 803, a block correlation 305 between the code blocks 303 can be calculated by the project division module 302. The project division module 302 may perform feature extraction on each of the code blocks, as well as feature selection and principal component analysis on the attributes of each code block 303. Using the extracted features and attributes of each code block, an original distance between each of the pairs of code blocks can be calculated using the Euclidean Distance between each pair code blocks 303. Code blocks 303 and block correlation 305 data can be passed to the distance mapping module 307.

In step 805, distance mapping module 307 may use the Euclidean Distances calculated by the project division module 302 to generate an Original Distance Map of the project 301. The Original Distance Map can include a plurality of nodes, wherein each node represents a corresponding code block 303 of the project 301, and edges connecting pairs of nodes together are of a length or weight as calculated using the Euclidean Distance and/or other block correlation 305 methods. In step 807 of method 800, the distance mapping module 307 may dynamically scale the Original Distance Map using the historical code deliveries 304 of the code blocks 303 by all users to generate a Dynamic General Distance Map 309. As the historical code deliveries indicate an increased number of commits that include both code blocks 303 in a pair of code blocks 303, the length of the edge between the pair of code blocks may decrease in length, drawing the code blocks closer together on the Dynamic General Distance Map 309. Similarly, where commits of only one code block 303 of the pair of code blocks frequently occurs, or nether code block receives commits as indicated by the code delivery history for the code blocks 303, the edge between code blocks on the Dynamic General Distance Map 309 may increase in length, further separating the nodes representing the pair of code blocks 303 further apart.

In step 809 of method 800, the distance mapping module 307 may generate and/or update a Dynamic User Distance Map 311 using the Dynamic General Distance Map 309 as a basis. The distance mapping module 307 generates the Dynamic User Distance Map 311 for each user by inserting or adding a commit count 620 to each node of the Dynamic General Distance Map 309. In step 811 a determination is made by the distance mapping module 307 whether or not an additional code delivery of at least one code block has occurred. If at least one code delivery has occurred, the method 800 may proceed to step 813 wherein the distance mapping module 307 updates the Dynamic User Distance Map 311 by increasing the commit count of the nodes involved in the code deliver and decreasing the length of the edge(s) connecting nodes to the node of the code block(s) 303 receiving an increase to the commit count 620. Conversely, if in step 811 an additional code delivery of at least one code block 303 has not occurred, the method 800 may proceed to step 815.

During step 815 of method 800, the distance mapping module 307 may identify whether or not the last code commits of at least one code block 303 has not occurred for a period of time that is greater than a threshold period of time. If a code commit for a code block has not occurred in the prescribed period of time, the method 800 may proceed to step 817 wherein the distance mapping module 307 may update the Dynamic User Distance Map 311 by decreasing the commit count of the corresponding code block 303 that has not received the code commit within the threshold period of time, increasing the length of the edge(s) connecting the node corresponding to the code block 303 not receiving the code commit to other nodes of the Dynamic User Distance Map 311. Increasing the distance between the connected nodes. If, however, in step 815, the most recent code commits for at least code block 303 is not greater than the threshold amount of time, the method 800 may proceed to step 819. During step 819, the distance mapping module 307 may further determine whether a new code delivery for the software project 301 is being performed. If a new code delivery is not occurring, the method 800 may return to step 807 and continue to update the Dynamic General Distance Map 309 and the Dynamic User Distance Map 311. However, if a new code delivery for the software project does occur, the method 800 may proceed from step 819 to step 821.

In step 821 of method 800, the code delivery distance is quantified using the user's respective Dynamic User Distance Map 311. For example, by calculating the MST comprising the shortest path of edges connecting each of the code blocks 303 being delivered. The value of the code delivery distance indicates the potential difficulty and/or risk of delivering code across multiple code blocks in a single delivery of code. In step 823, the code delivery distance 317 for each user is evaluated against delivery assessment criteria 315 wherein the delivery assessment criteria is defined as the sum of the initial step length plus the dynamic step length. In step 825, the code delivery distance is compared against the delivery assessment criteria to determine whether or not the value of the code delivery distance is greater than the value of the delivery assessment criteria. If the code delivery distance value is greater, the method may proceed to step 827 whereby the code evaluation delivery module 313 outputs an evaluation result 319 indicating a high level of risk associated with the code delivery and/or an indication that users should attentively apply more rigorous review and/or testing of the code being delivered. Conversely, if in step 825 the value of the code delivery distance is less than the value of the delivery assessment criteria, the method 800 may proceed to step 829, wherein the code evaluation delivery module 313 outputs an evaluation result 319 indicating a medium or low level or risk and/or an indication that a less rigorous review or testing may be needed for the code being delivered.

FIG. 9 depicts an embodiment of a method 900 for recommending and/or selecting a user to review code of a code delivery. Method 900 may be performed as part of method 800 described above and/or method 900 may be performed as a separate process for identifying and/or recommending a reviewer of the code being delivered. The method 900 may begin at step 901. At step 901 a code delivery is received comprising one or more code blocks 303 of a project along with a request to review the code delivery. In step 903, embodiments may, using the Dynamic User Distance Map, select one or more users as potential reviewers of the code block(s) 303 being delivered. In step 905, a determination may be made whether the code delivery being reviewed comprises more than one code block 303. If in step 905 a determination is made that the code delivery comprises more than one code block 303, the method 900 may proceed to step 907.

During step 907 of method 900, the code evaluation delivery module 313 may calculate a minimum spanning tree length for each user based on the position of the code blocks 303 that are part of the code delivery within the Dynamic User Distance Map 311. In step 909 the MST lengths for each user are compared amongst the MSTs of all potential reviewers. The code evaluation delivery module 313 may select and/or recommend the potential reviewer with the shortest MST length as reviewer of the code blocks of the code delivery. Embodiments of the code evaluation delivery module 313 may include the recommendation of the selected reviewer within the evaluation results 319 outputted by the code evaluation delivery module 313.

Referring back to step 905, if there is not more than one code block in the code block delivery, the method 900 may proceed to step 911. During step 911, the code evaluation delivery module 313 may use the Dynamic User Distance Map for each user to identify the best user for reviewing the code block 303 of the code delivery. The code evaluation delivery module 313 may select or apply a diameter or radius around the code block being delivered as it resides on each of the Dynamic User Distance Maps corresponding to each potential reviewer. In step 913, the code evaluation delivery module 313 may identify, for each user considered to be a potential reviewer, the number of code blocks 303 within the established radius around the code block being delivered. In step 915, the code evaluation delivery module 313 may recommend the user having the greatest number of nearby code blocks 303 within the established radius or diameter around the code block that is being delivered, as the reviewer to review the code delivery. Embodiments of the code evaluation delivery module 313 may include the recommendation of the selected reviewer within the evaluation results 319 outputted by the code evaluation delivery module 313.

What is claimed is:

1. A computer-implemented method for automating evaluations of code delivery, the computer-implemented method comprising:
   dividing, by a processor, a software project into a plurality of code blocks;
   calculating, by the processor, a correlation between pairs of the code blocks based on Euclidean Distance between each of the pairs of the code blocks;
   generating, by the processor, a mapping of the code blocks describing an original distance between the code blocks (an Original Distance Map), wherein the Original Distance Map comprises nodes representing each of the code blocks and an edge between the nodes having a distance corresponding to the Euclidean Distance calculated between the pairs of the code blocks;
   generating, by the processor, a Dynamic General Distance Map by dynamically scaling the distance between the nodes of the Original Distance Map based on a counting of commits over a period of time that have been applied to one or more of the pairs of the code blocks; and
   creating, by the processor, a Dynamic User Distance Map based on the Dynamic General Distance Map, by inserting a commit count for each of the nodes wherein a higher commit count for a node indicates an increased level of a user's familiarity with a code block corresponding to the node.

2. The computer-implemented method of claim 1, further comprising:
   quantifying, by the processor, a code delivery distance representing a total distance of all of the code blocks within the code delivery;
   evaluating, by the processor, the code delivery distance for the code delivery using delivery assessment criteria, wherein the code delivery distance is greater than the delivery assessment criteria; and
   outputting, by the processor, an indication of a high level of risk is to a user.

3. The computer-implemented method of claim 1, wherein the step of dividing the software project into the plurality of code blocks is performed by dividing the code blocks based on a physical code structure of the software project.

4. The computer-implemented method of claim 1, wherein scaling the distance between the nodes of the Original Distance Map based on a counting of commits over a period of time is performed using a formula:

$$\text{GenDis}(m,n) = \alpha * \text{OriDis}(m,n) + (1-\alpha) * \text{OriDis}(m,n) * e^{-\lambda * \text{CommitCount}(m,n,t)},$$

wherein $\alpha$ is a number between 0 and 1, $\lambda$ is a positive number, OriDis(m,n) is the distance corresponding to the Euclidean Distance calculated between a first node and a second node representing the pairs of the code blocks in the Original Distance Map, and CommitCount$_{(m,n,t)}$ is a counting of a number of commits over the period of time that are applied to both the first node and the second node.

5. The computer-implemented method of claim 4, wherein the GenDis(m,n) indicates a decrease in distance between the first node and the second node within the Dynamic General Distance Map each time the commits include a first code block of the first node and a second code block of the second node, and the distance between the first node and the second node increases upon a time interval between the commits that include both the first block of code of the first node and the second code block of the second node, exceeds a threshold amount of time.

6. The computer-implemented method of claim 1, wherein distance between nodes of the Dynamic User Distance Map decreases as commit counts for each of the nodes increase, and the distance between nodes of the Dynamic User Distance Map increases between nodes having a decreasing number of code commits indicating a code block has not received a commit for a period time that is greater than a threshold period of time.

7. The computer-implemented method of claim 2, wherein:
   delivery assessment criteria=initial step length+dynamic step length, wherein the initial step length is a predefined value or calculated as $$\frac{\left(\begin{array}{c}\text{a length defined by the code delivery distance}\\ \text{measured by the Dynamic General Distance Map}\end{array}\right)}{(\text{a number of code blocks in the code delivery} - 1)}$$

and the dynamic step length is a distance between nodes of code blocks of the code blocks with the code delivery as measured by dynamic User Distance Map.

8. A computer system for automating evaluations of code delivery comprising:
   a processor; and
   a computer-readable storage media coupled to the processor, wherein the computer-readable storage media contains program instructions executing, via the processor, a computer-implemented method comprising:
      dividing, by the processor, a software project into a plurality of code blocks;
      calculating, by the processor, a correlation between pairs of the code blocks based on Euclidean Distance between each of the pairs of the code blocks;
      generating, by the processor, a mapping of the code blocks describing an original distance between the code blocks (an Original Distance Map), wherein the Original Distance Map comprises nodes representing each of the code blocks and an edge between the nodes having a distance corresponding to the Euclidean Distance calculated between the pairs of the code blocks;
      generating, by the processor, a Dynamic General Distance Map by dynamically scaling the distance between the nodes of the Original Distance Map based on a counting of commits over a period of time that have been applied to one or more of the pairs of the code blocks; and
      creating, by the processor, a Dynamic User Distance Map based on the Dynamic General Distance Map, by inserting a commit count for each of the nodes wherein a higher commit count for a node indicates an increased level of a user's familiarity with a code block corresponding to the node.

9. The computer system of claim 8, further comprising:
quantifying, by the processor, a code delivery distance representing a total distance of all of the code blocks within the code delivery;
evaluating, by the processor, the code delivery distance for the code delivery using delivery assessment criteria, wherein the code delivery distance is greater than the delivery assessment criteria; and
outputting, by the processor, an indication of a high level of risk is to a user.

10. The computer system of claim 8, wherein the step of dividing the software project into the plurality of code blocks is performed by dividing the code blocks based on a physical code structure of the software project.

11. The computer system of claim 8, wherein scaling the distance between the nodes of the Original Distance Map based on a counting of commits over a period of time is performed using a formula:

$$\text{GenDis}(m,n)=\alpha*\text{OriDis}(m,n)+(1-\alpha)*\text{OriDis}(m,n)* e^{-\lambda*\text{CommitCount}_{(m,n,t)}},$$

wherein α is a number between 0 and 1, λ is a positive number, OriDis(m,n) is the distance corresponding to the Euclidean Distance calculated between a first node and a second node representing the pairs of the code blocks in the Original Distance Map, and $\text{CommitCount}_{(m,n,t)}$ is a counting of a number of commits over the period of time that are applied to both the first node and the second node.

12. The computer system of claim 11, wherein the GenDis(m,n) indicates a decrease in distance between the first node and the second node within the Dynamic General Distance Map each time the commits include a first code block of the first node and a second code block of the second node, and the distance between the first node and the second node increases upon a time interval between the commits that include both the first block of code of the first node and the second code block of the second node, exceeds a threshold amount of time.

13. The computer system of claim 8, wherein distance between nodes of the Dynamic User Distance Map decreases as commit counts for each of the nodes increase, and the distance between nodes of the Dynamic User Distance Map increases between nodes having a decreasing number of code commits indicating a code block has not received a commit for a period time that is greater than a threshold period of time.

14. The computer system of claim 9, wherein:
delivery assessment criteria=initial step length+dynamic step length, wherein the initial step length is a predefined value or calculated as $$\left(\frac{\text{a length defined by the code delivery distance measured by the Dynamic General Distance Map}}{\text{(a number of code blocks in the code delivery} - 1)}\right)$$

and the dynamic step length is a distance between nodes of code blocks of the code blocks with the code delivery as measured by dynamic User Distance Map.

15. A computer program product for automating evaluations of code delivery comprising:
one or more computer readable storage media having computer-readable program instructions stored on the one or more computer readable storage media, said program instructions executes a computer-implemented method comprising:
dividing, by a processor, a software project into a plurality of code blocks;
calculating, by the processor, a correlation between pairs of the code blocks based on Euclidean Distance between each of the pairs of the code blocks;
generating, by the processor, a mapping of the code blocks describing an original distance between the code blocks (an Original Distance Map), wherein the Original Distance Map comprises nodes representing each of the code blocks and an edge between the nodes having a distance corresponding to the Euclidean Distance calculated between the pairs of the code blocks;
generating, by the processor, a Dynamic General Distance Map by dynamically scaling the distance between the nodes of the Original Distance Map based on a counting of commits over a period of time that have been applied to one or more of the pairs of the code blocks; and
creating, by the processor, a Dynamic User Distance Map based on the Dynamic General Distance Map, by inserting a commit count for each of the nodes wherein a higher commit count for a node indicates an increased level of a user's familiarity with a code block corresponding to the node.

16. The computer program product of claim 15, further comprising:
quantifying, by the processor, a code delivery distance representing a total distance of all of the code blocks within the code delivery;
evaluating, by the processor, the code delivery distance for the code delivery using delivery assessment criteria, wherein the code delivery distance is greater than the delivery assessment criteria; and
outputting, by the processor, an indication of a high level of risk is to a user.

17. The computer program product of claim 15, wherein the step of dividing the software project into the plurality of code blocks is performed by dividing the code blocks based on a physical code structure of the software project.

18. The computer program product of claim 15, wherein scaling the distance between the nodes of the Original Distance Map based on a counting of commits over a period of time is performed using a formula:

$$\text{GenDis}(m,n)=\alpha*\text{OriDis}(m,n)+(1-\alpha)*\text{OriDis}(m,n)* e^{-\lambda*\text{CommitCount}_{(m,n,t)}},$$

wherein α is a number between 0 and 1, λ is a positive number, OriDis(m,n) is the distance corresponding to the Euclidean Distance calculated between a first node and a second node representing the pairs of the code blocks in the Original Distance Map, and $\text{CommitCount}_{(m,n,t)}$ is a counting of a number of commits over the period of time that are applied to both the first node and the second node.

19. The computer program product of claim 15, wherein distance between nodes of the Dynamic User Distance Map decreases as commit counts for each of the nodes increase, and the distance between nodes of the Dynamic User Distance Map increases between nodes having a decreasing number of code commits indicating a code block has not received a commit for a period time that is greater than a threshold period of time.

20. The computer program product of claim 16, wherein:
delivery assessment criteria=initial step length+dynamic step length, wherein the initial step length is a predefined value or calculated as $$\frac{\left(\begin{array}{c}\text{a length defined by the code delivery distance}\\ \text{measured by the Dynamic General Distance Map}\end{array}\right)}{(\text{a number of code blocks in the code delivery} - 1)}$$

and the dynamic step length is a distance between nodes of code blocks of the code blocks with the code delivery as measured by dynamic User Distance Map.

\* \* \* \* \*